W. F. HELMOND.
TYPE WRITING MACHINE.
APPLICATION FILED FEB. 26, 1909.
930,962.
Patented Aug. 10, 1909.
2 SHEETS—SHEET 1.
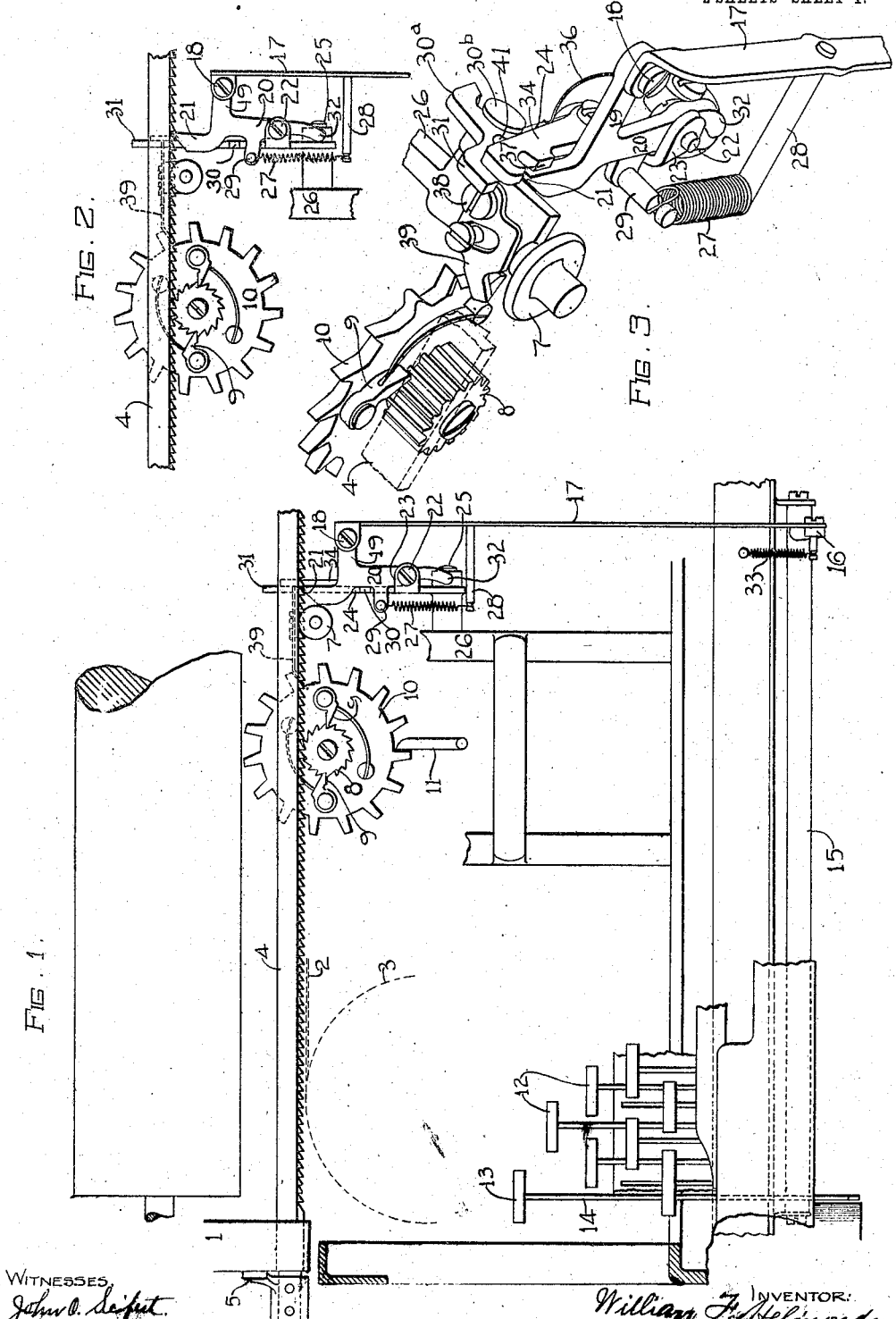
WITNESSES
INVENTOR:
William F. Helmond
By
ATTORNEY W. F. HELMOND.
TYPE WRITING MACHINE.
APPLICATION FILED FEB. 26, 1909.
930,962.
Patented Aug. 10, 1909.
2 SHEETS—SHEET 2.
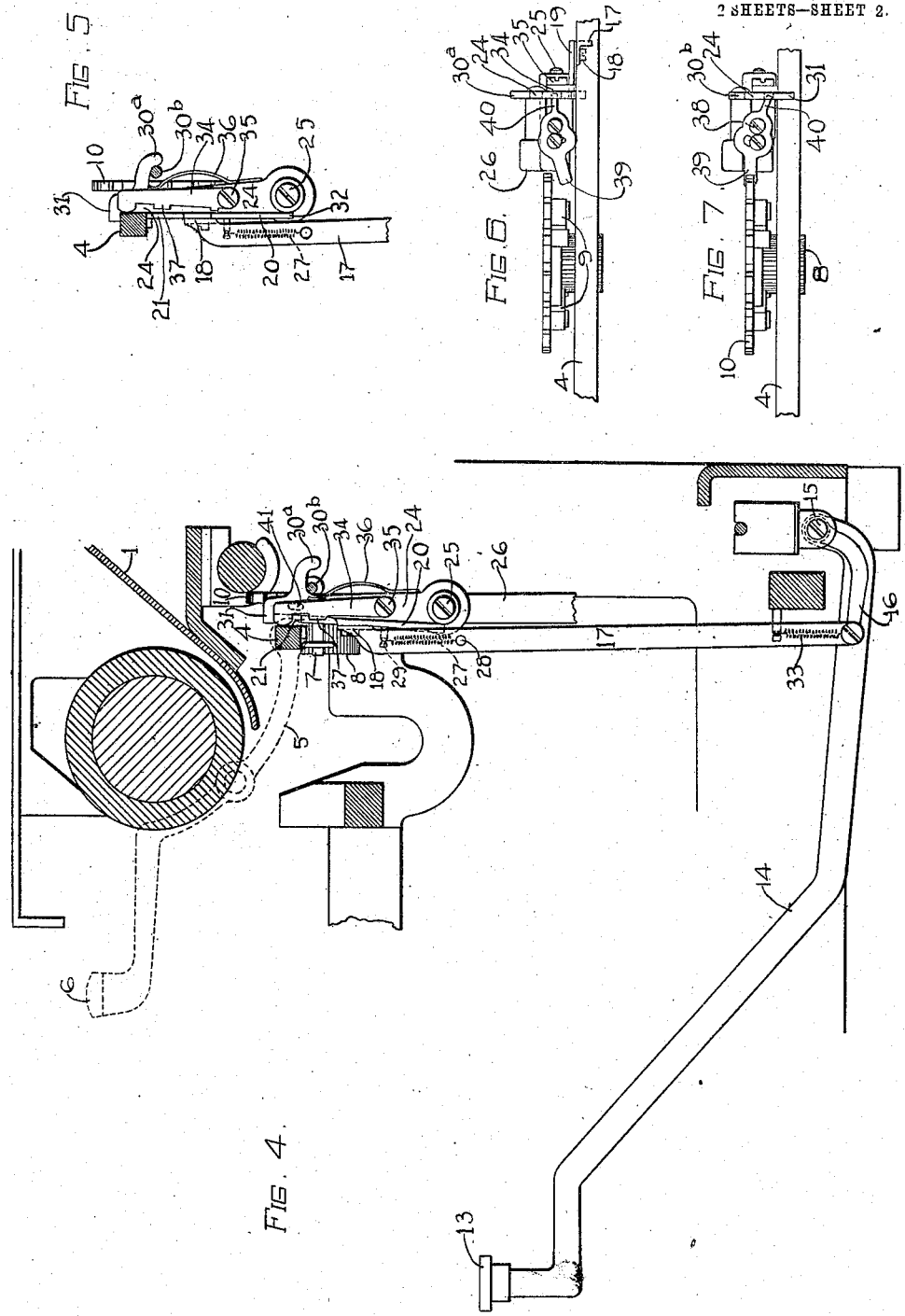
WITNESSES:
John O. Seifert
K. Frankfort
INVENTOR:
William F. Helmond
By Stickney
ATTORNEY

UNITED STATES PATENT OFFICE.

WILLIAM F. HELMOND, OF HARTFORD, CONNECTICUT, ASSIGNOR TO UNDERWOOD TYPE-WRITER COMPANY, OF NEW YORK, N. Y., A CORPORATION OF NEW JERSEY.

TYPE-WRITING MACHINE.

No. 930,962.　　　Specification of Letters Patent.　　　Patented Aug. 10, 1909.

Application filed February 26, 1909. Serial No. 480,110.

*To all whom it may concern:*

Be it known that I, WILLIAM F. HELMOND, a citizen of the United States, residing in Hartford, in the county of Hartford and State of Connecticut, have invented certain new and useful Improvements in Type-Writing Machines, of which the following is a specification.

This invention relates to means for setting back the power-driven carriage of a typewriting machine a step at a time by means of a key usually placed at the keyboard. It has been usual to employ, for this purpose, a dog or pawl which is pivoted, the pivotal action permitting the pawl to return to normal position independently of the carriage rack after back-spacing the latter. The consequence of pivoting the pawl, however, is to render the carriage liable to overthrow at the back-spacing operation, since a pivoted pawl cannot of itself restrain the carriage against overthrow. Various methods have been adopted to prevent this faulty action of the carriage.

The object of the present invention is to provide a simple and reliable mechanism for back-spacing the carriage and guarding against overthrow thereof. To this end, a back-spacing dog is employed, which is incapable of being forced out of the rack by the action of the latter thereon when the carriage is driven back violently. So long as the dog is in engagement with the rack, the movement of the latter is positively limited, the dog being incapable of being depressed or of escaping from the rack in the manner of the ordinary pivoted pawl.

Instead of mounting the dog in the plane of the rack, to swing up and down into and out of engagement with its teeth, the dog in the present instance is mounted at one side of the rack, and is moved first laterally into engagement with the rack teeth and then backwardly to back-space the carriage; a stop being placed in the path of the dog to limit its backward movement, and the dog serving as a positive lock against overthrow. Upon release of the key the dog first moves laterally out of engagement with the rack, and then springs to normal position; there being in all four movements of the dog. Thus the rack and carriage are brought under positive control with excellent results, and the back-spacing key may be operated rapidly and violently, without liability of faulty action on the part of the carriage.

In the accompanying drawings, Figure 1 is a front view showing the present invention applied to the carriage of the well known Underwood typewriting machine; the parts being shown in normal positions. Fig. 2 is a fragmentary view showing the rack as having been spaced backward by the back-spacing dog. Fig. 3 is a top front perspective view of the back-spacing devices. Fig. 4 is a sectional side elevation showing the parts in normal positions. Fig. 5 is a fragmentary side elevation showing the dog as having been swung into engagement with the rack. Fig. 6 is a plan of the back-spacing devices in normal positions. Fig. 7 is a plan showing the abnormal positions of the parts.

A carriage 1 is connected by a strap 2 to a driving spring-barrel 3, and has a releasable rack 4 hung by arms 5 on the carriage, one of said arms carrying a release key 6. The rack normally rests upon a roll 7. The teeth are upon the under side of the rack and in mesh with a pinion 8, which is connected by pawls 9 to an escapement wheel 10; the movements of the latter controlled through dogs 11 by means of the type keys 12.

At the keyboard is provided a back-space key 13 upon the forward end of a lever 14, which extends forwardly from a rock-shaft 15, the latter crossing the machine and having at its other end a depressible arm 16. From the latter extends upwardly a link 17, which is pivoted at its upper end at 18 to an arm 19 extending horizontally from an upstanding back-spacing dog or dog-lever 20, the latter having a tooth 21 to engage the rack. This dog 20 is capable of a very limited movement about a pivot 22 from the Fig. 1 position to the Fig. 2 position, and it will be seen that the direction of this movement is substantially in the same direction as the movement of the rack 4. The pivot 22 is about perpendicularly under the dog, and in consequence, when the dog is in engagement with the rack, the latter is locked to the former, and cannot move independently thereof.

Normally the dog or its tooth 21 stands alongside of or in rear of the rack, as seen in Fig. 4. A depression of the key 13 operates through the link 17, to swing the dog laterally into engagement with the rack, as at Fig. 5. This swinging movement is provided for by pivoting the dog at 22 upon an ear 23 formed upon an arm or lever 24, which is pivoted at 25 upon the framework 26, to swing toward the front and rear of the machine. It will be seen at Figs. 4 and 5 that the point of connection at 18 between the link 17 and the dog 20 is forward of the pivot 25; and in consequence, a downward pull on the link 17 tends to swing the lever 24 forwardly.

When the key 13 is depressed, the rock shaft 15 turns and the arm 16 descends, pulling down the link 17 and swinging the lever 24 (together with the dog 20) forwardly about the pivot 25, to swing the dog laterally into engagement with the rack, as at Fig. 5. During this swinging movement toward the front of the machine, the dog 20 remains in the Fig. 1 position, because a spring 27 resists the tendency of the link 17 to swing the dog about its pivot 22. This spring is carried by a stud 28 projecting from the link 17, and is connected with an arm 29 on the opposite side of the pivot 20 on the dog-operating arm 19. This spring 27 normally holds the dog against a stop 30 formed on the lever 24. There is little or no resistance to this forward movement of the lever 24, because there is no returning spring attached to the latter, and hence the pull of the link 17 first causes a lateral or bodily movement of the dog toward the front of the machine. This movement is arrested by the engagement of the lever 24 with the rear side of the rack 4, or by the engagement of a stop-finger 30$^a$ upon the lever with a stud 30$^b$ upon the framework of the machine; the top of said lever being formed into a hook 31, to catch over the top of the rack, to prevent jumping thereof at the back-spacing operation. Continual downward pull upon the link is now effective against tension of the spring 27, to swing the dog about the pivot 22 from the Fig. 1 to the Fig. 2 position, to throw the rack and carriage back for a letter space; this movement of the dog being arrested by a stop 32 formed thereon, to bear against the face of the main lever 24.

It will be understood that at the conclusion of the back-spacing movement of the dog, Fig. 2, the rack is positively arrested, because it cannot force the dog farther about the pivot 22, and cannot jump over the tooth of the dog.

Upon relief of the key 13 from pressure, a spring 33 connected to arm 16 lifts the key and the link 17, and first swings the main lever 24 backwardly from the Fig. 5 position to the Fig. 4 position, to permit the dog lever 20 to escape from the rack; whereupon said spring 33, aided by spring 27, swings the dog to the left along the rack from the Fig. 2 to the normal Fig. 1 position.

Preferably there is provided a latch 34 pivoted at 35 upon the main lever or rocker 24, and pressed by a spring 36 against the rear face of the rack 4. This latch has a slight projection or tooth 37, which is normally in the path of the dog tooth 21, to prevent the latter from rocking about the pivot 22, as will be understood from Fig. 4. The dog however escapes this latch in the Fig. 5 position, so that it may vibrate freely from the Fig. 1 to the Fig. 2 position. Upon the relief of the finger key, the dog, which now overlaps the latch (Fig. 2) presses the latch backwardly out of the way, so that the latch cannot oppose the swinging of the dog to its normal Fig. 1 position.

To prevent back lash of the escapement wheel 10 at the back-spacing operation, there is pivoted at 38 upon the framework 26 a dog 39 having a finger 40, Fig. 6, to engage a perforation 41, Fig. 4, formed in the main lever 24, whereby upon the movement of the main lever 24 to the Fig. 5 position, the dog 39 is swung from the Fig. 6 to the Fig. 7 position, to engage the adjacent tooth of the wheel 10, and lock the same against backward movement.

It will be seen that the dog lever 20 is supported against depression by the rack, since owing to the pivot mounted at 22 directly under the tooth of the dog, the latter cannot descend, but must swing substantially in the direction of the rack movement; and this swinging movement is limited by the stop 32. The movement of the dog lever and the main lever 24 backwardly away from the rack is limited by the engagement of the edge of the main lever with the stop 30$^b$. The pivots 22 and 25 taken together form a universal joint for the dog upon which it can swing in the described four directions.

Variations may be resorted to within the scope of the invention, and portions of the improvements may be used without others.

Having thus described my invention, I claim:

1. In a typewriting machine, the combination with a power-driven carriage having an escapement rack, of a back-spacing dog normally at one side of the rack, and a back-spacing key connected to means to move said dog sidewise into engagement with the rack, then in a direction to space the rack backwardly, then sidewise out of engagement with the rack, and then back to normal position; a stop being provided to limit the rack-actuating stroke of the dog, and the latter being supported against depression by the rack.

2. In a typewriting machine, the combination with a power-driven carriage having an escapement rack, of a back-spacing dog normally at one side of the rack, and a back-spacing key connected to means to lock the rack against jumping up and to move said dog sidewise into engagement with the rack, then in a direction to space the rack backwardly, then sidewise out of engagement with the rack, and then back to normal position; a stop being provided to limit the rack-actuating stroke of the dog, and the latter being supported against depression by the rack.

3. In a typewriting machine, the combination with a power-driven carriage having an escapement rack or series of teeth, of a back-spacing dog normally at one side of the rack, a back-spacing key connected to means to move said dog sidewise into engagement with the rack, and then in a direction to space the rack backwardly, stops being provided to limit the recited movements of the dog, and a spring device effective to return the key and move the dog sidewise out of engagement with the rack, and then back to normal position; stops being provided to limit the last two movements of the dog, and the latter being supported against depression by the rack.

4. In a typewriting machine, the combination with a power-driven carriage having an escapement rack or series of teeth, of a back-spacing dog normally at one side of the rack and pivotally supported for universal movement and having an operating arm, and means, including a key connected to said arm, for causing said arm to move said dog upon its pivotal support, first laterally into engagement with the rack, then in a direction to back-space the carriage, then laterally out of engagement with the rack, and then back to normal position.

5. In a typewriting machine, the combination with a power-driven carriage having an escapement rack or series of teeth, of a back-spacing dog normally at one side of the rack and pivotally supported for universal movement and having an operating arm, means, including a key connected to said arm, for causing said arm to move said dog upon its pivotal support, first laterally into engagement with the rack, then in a direction to back-space the carriage, then laterally out of engagement with the rack, and then back to normal position, and a stop to limit the rack-actuating stroke of the dog.

6. In a typewriting machine, the combination with a power-driven carriage having an escapement rack or series of teeth, of a back-spacing dog normally at one side of the rack and pivotally supported for universal movement and having an operating arm, means, including a key connected to said arm, for causing said arm to move said dog upon its pivotal support, first laterally into engagement with the rack, then in a direction to back-space the carriage, then laterally out of engagement with the rack, and then back to normal position, a stop to limit the rack-actuating stroke of the dog, and a stop to limit the movement of the dog into engagement with the rack.

7. In a typewriting machine, the combination with a power-driven carriage having an escapement rack or series of teeth, of a back-spacing dog normally at one side of the rack and pivotally supported for universal movement and having an operating arm, means, including a key-operated link connected to said arm, for causing said arm to move said dog upon its pivotal support, first laterally into engagement with the rack, and then in a direction to back space the carriage, and a spring device acting through said link to move the dog both laterally out of engagement with the rack and back to normal position.

8. In a typewriting machine, the combination with a power-driven carriage having an escapement rack or series of teeth, of a main lever pivoted adjacent to the rack, a back-spacing dog-lever pivoted to said main lever, the pivot of the dog-lever being transverse to that of the main lever to permit movement of the dog-lever both laterally into and out of the rack and also longitudinally of the rack, and means to effect movement of the dog-lever about said pivots in alternation, to move the dog-lever first into engagement with the rack, then in a direction to drive the carriage back, then out of engagement with the rack, and then back to normal position.

9. In a typewriting machine, the combination with a power-driven carriage having an escapement rack or series of teeth, of a main lever pivoted adjacent to the rack, a back-spacing dog-lever pivoted to said main lever, the pivot of the dog-lever being transverse to that of the main lever to permit movement of the dog-lever both laterally into and out of the rack and also longitudinally of the rack, and means to effect movement of the dog-lever about said pivots in alternation, to move the dog-lever first into engagement with the rack, then in a direction to drive the carriage back, then out of engagement with the rack, and then back to normal position, means being provided to coöperate with said dog-lever to prevent overthrow of the carriage at the back-spacing operation.

10. In a typewriting machine, the combination with a power-driven carriage having an escapement rack or series of teeth, of a main lever or carrier pivoted adjacent to the rack, a back-spacing dog-lever pivoted upon said main lever, the pivot of the dog-lever being transverse to that of the main lever to permit movement of the dog-lever both laterally into and out of the rack and also longitudinally of the rack, said dog lever having an arm, and key-operated means for applying power to said arm to turn the dog about said pivots in alternation, first to move into engagement with the rack and then to drive the carriage back.

11. In a typewriting machine, the combination with a power-driven carriage having an escapement rack or series of teeth, of a main lever or carrier pivoted adjacent to the rack, a back-spacing dog-lever pivoted upon said main lever, the pivot of the dog-lever being transverse to that of the main lever to permit movement of the dog-lever both laterally into and out of the rack and also longitudinally of the rack, said dog lever having an arm, key-operated means for applying power to said arm to turn the dog about said pivots in alternation, first to move into engagement with the rack and then to drive the carriage back, and yielding means to move said dogs about said pivots in alternation, first out of engagement with the rack, and then back to normal position.

12. In a typewriting machine, the combination with a power-driven carriage having an escapement rack or series of teeth, of a main lever or carrier pivoted adjacent to the rack, a back-spacing dog-lever pivoted upon said main lever, the pivot of the dog-lever being transverse to that of the main lever to permit movement of the dog-lever both laterally into and out of the rack and also longitudinally of the rack, said dog lever having an arm, key-operated means for applying power to said arm to turn the dog about said pivots in alternation, first to move into engagement with the rack and then to drive the carriage back, and yielding means to move said dogs about said pivots in alternation, first out of engagement with the rack, and then back to normal position; said dog-lever constructed to lock the carriage against overthrow at the back-spacing operation.

13. In a typewriting machine, the combination with a power-driven carriage having an escapement rack or series of teeth, of a main lever or carrier pivoted adjacent to the rack, a back-spacing dog-lever pivoted upon said main lever, the pivot of the dog-lever being transverse to that of the main lever to permit movement of the dog-lever both laterally into and out of the rack and also longitudinally of the rack, said dog lever having an arm, key-operated means for applying power to said arm to turn the dog about said pivots in alternation, first to move into engagement with the rack and then to drive the carriage back, and a spring acting through said arm and effective to return the main lever to normal position.

14. In a typewriting machine, the combination with a power-driven carriage having an escapement rack or series of teeth, of a main lever or carrier pivoted adjacent to the rack, a back-spacing dog-lever pivoted upon said main lever, the pivot of the dog-lever being transverse to that of the main lever to permit movement of the dog-lever both laterally into and out of the rack and also longitudinally of the rack, said dog-lever having an arm, key-operated means for applying power to said arm to turn the dog about said pivots in alternation, first to move into engagement with the rack and then to drive the carriage back, and a spring acting through said arm and effective to return the main lever to normal position, and also tending to turn said dog-lever about its pivot back to normal position.

15. In a typewriting machine, the combination with a power driven carriage having an escapement rack or series of teeth, of a main lever mounted to vibrate across the rack, a back-spacing dog-lever pivoted on said main lever and movable laterally therewith into engagement with the rack, and a key-operated device engaging said dog-lever to act first upon the main lever and cause it to swing the dog-lever laterally into engagement with the rack, and then upon the dog-lever to turn it about its own pivot and cause it to back-space the carriage.

16. In a typewriting machine, the combination with a power-driven carriage having an escapement rack or series of teeth, of a main lever mounted to vibrate across the rack, a back-spacing dog-lever pivoted on said main lever and movable laterally therewith into engagement with the rack, a key-operated device engaging said dog-lever to act first upon the main lever and cause it to swing the dog-lever laterally into engagement with the rack, and then upon the dog-lever to turn it about its own pivot and cause it to back-space the carriage, and a stop engaging the dog-lever to limit the backward movement of the carriage.

17. In a typewriting machine, the combination with a power-driven carriage having an escapement rack or series of teeth, of a main lever mounted to vibrate across the rack, a back-spacing dog-lever pivoted on said main lever and movable laterally therewith into engagement with the rack, a key-operated device engaging said dog-lever to act first upon the main lever and cause it to swing the dog-lever laterally into engagement with the rack, and then upon the dog-lever to turn it about its own pivot and cause it to back-space the carriage, and a stop engaging the dog-lever to limit the backward movement of the carriage; the dog-lever being laterally movable out of the rack after the carriage-retracting operation, and yielding means being provided to return the dog-lever and main lever to normal positions.

18. In a typewriting machine, the combination with a power-driven carriage having an escapement rack, of a main lever pivoted to vibrate across the rack, a dog lever pivoted on said main lever to vibrate along the rack, the dog upon said dog-lever normally standing at one side of the rack, an arm on said dog lever, a key-operated link or device connected to said arm in position to vibrate the main lever to carry the dog laterally into engagement with the rack, and in position also to vibrate the dog-lever to back-space the rack, and a stop to limit the rack-actuating stroke of the dog-lever.

19. In a typewriting machine, the combination with a power-driven carriage having an escapement rack, of a main lever pivoted to vibrate across the rack, a dog-lever pivoted on said main lever to vibrate along the rack, the dog upon said dog-lever normally standing at one side of the rack, an arm on said dog lever, a key-operated link or device connected to said arm in position to vibrate the main lever to carry the dog laterally into engagement with the rack, and in position also to vibrate the dog-lever to back-space the rack, a stop to limit the rack-actuating stroke of the dog-lever, and a spring tending to turn the dog to its normal position relatively to the main lever.

20. In a typewriting machine, the combination with a power-driven carriage having an escapement rack, of a main lever pivoted to vibrate across the rack, a dog-lever pivoted on said main lever to vibrate along the rack, the dog upon said dog-lever normally standing at one side of the rack, an arm on said dog lever, a key-operated link or device connected to said arm in position to vibrate the main lever to carry the dog laterally into engagement with the rack, and in position also to vibrate the dog-lever to back-space the rack, a stop to limit the rack-actuating stroke of the dog-lever, and a spring tending to turn the dog to its normal position relatively to the main lever; said spring carried by said link on the opposite side of the dog-lever pivot from said arm.

21. In a typewriting machine, the combination with a power-driven carriage having an escapement rack, of a main lever pivoted to vibrate across the rack, a dog-lever pivoted on said main lever to vibrate along the rack, the dog upon said dog-lever normally standing at one side of the rack, an arm on said dog lever, a key-operated link or device connected to said arm in position to vibrate the main lever to carry the dog laterally into engagement with the rack, and in position also to vibrate the dog-lever to back-space the rack, a stop to limit the rack-actuating stroke of the dog-lever, a spring tending to turn the dog to its normal position relatively to the main lever, and a spring connected to said link to return the main lever to normal position.

22. In a typewriting machine, the combination with a power-driven carriage having an escapement rack, of a main lever pivoted to vibrate across the rack, a dog-lever pivoted on said main lever to vibrate along the rack, the dog upon said dog-lever normally standing at one side of the rack, an arm on said dog-lever, a key-operated link or device connected to said arm in position to vibrate the main lever to carry the dog laterally into engagement with the rack, and in position also to vibrate the dog-lever to back-space the rack, and a stop to limit the rack-actuating stroke of the dog-lever; said rack being releasable, and said main lever having a catch to engage said rack to prevent jumping thereof at the back-spacing operation.

23. In a typewriting machine, the combination with a power-driven carriage having an escapement rack or series of teeth, of a main lever mounted to vibrate across the rack, stops to limit the vibration of said lever, a back-spacing dog-lever pivoted on said main lever and movable laterally therewith into engagement with the rack and provided with an operating arm, a key-operated device engaging said arm to act first upon the main lever and to cause it to swing the dog-lever laterally into engagement with the rack, and then upon the dog-lever to turn it about its own pivot and cause it to back-space the carriage, stops to limit the vibrations of the dog-lever upon its own pivot, and yielding means to return the main lever and dog-lever to normal positions; the dog-lever being supported against depression by the rack to prevent overthrow of the latter.

24. In a typewriting machine, the combination with a power-driven carriage having an escapement rack or series of teeth, of a main lever mounted to vibrate across the rack, stops to limit the vibration of said lever, a back-spacing dog-lever pivoted on said main lever and movable laterally therewith into engagement with the rack and provided with an operating arm, a key-operated device engaging said arm to act first upon the main lever and to cause it to swing the dog-lever laterally into engagement with the rack, and then upon the dog-lever to turn it about its own pivot and cause it to back-space the carriage, stops to limit the vibrations of the dog-lever upon its own pivot, yielding means to return the main lever and dog-lever to normal positions, the dog-lever being supported against depression by the rack to prevent overthrow of the latter, and a latch to prevent premature movement of the dog-lever along the rack at the depression of the key.

25. In a typewriting machine, the combination with a power-driven carriage having an escapement rack or series of teeth, of a back-spacing dog normally at one side of the rack and pivotally supported for universal movement and having an operating arm, and means, including a key connected to said arm, for causing said arm to move said dog upon its pivotal support, first laterally into engagement with the rack, then in a direction to back-space the carriage, then laterally out of engagement with the rack, and then back to normal position; a latch being provided to prevent movement of the dog along the rack before engaging the rack.

26. In a typewriting machine, the combination with a power-driven carriage having an escapement rack or series of teeth, of a main lever pivoted adjacent to the rack, a back-spacing dog-lever pivoted to said main lever, the pivot of the dog-lever being transverse to that of the main lever to permit movement of the dog-lever both laterally into and out of the rack and also longitudinally of the rack, means to effect movement of the dog-lever about said pivots in alternation, to move the dog-lever first into engagement with the rack, then in a direction to drive the carriage back, then out of engagement with the rack, and then back to normal position, and a latch pivoted upon said main lever to guard against accidental movement of the dog-lever along the rack before engaging with the rack.

27. In a typewriting machine, the combination with a power-driven carriage having an escapement rack, a pinion meshing therewith and an escapement wheel connected to the pinion by a pawl-and-ratchet mechanism, of a main lever, a back-spacing dog-lever pivoted to said main lever, the pivot of the dog-lever being transverse to that of the main lever to permit movement of the dog-lever both laterally into and out of the rack and also longitudinally of the rack, means to effect movement of the dog-lever about said pivots in alternation, to move the dog-lever first into engagement with the rack, then in a direction to drive the carriage back, then out of engagement with the rack, and then back to normal position, and a dog operated by said main lever to engage said escapement wheel to prevent backward movement thereof at the back-spacing movement of the carriage.

28. In a typewriting machine, the combination with a power-driven carriage having an escapement rack, a pinion meshing therewith and an escapement wheel connected to the pinion by a pawl-and-ratchet mechanism of a main lever, a back-spacing dog-lever pivoted to said main lever, the pivot of the dog-lever being transverse to that of the main lever to permit movement of the dog-lever both laterally into and out of the rack and also longitudinally of the rack, means to effect movement of the dog-lever about said pivots in alternation, to move the dog-lever first into engagement with the rack, then in a direction to drive the carriage back, then out of engagement with the rack, and then back to normal position, and a dog operated by said main lever to engage said escapement wheel to prevent backward movement thereof at the back-spacing movement of the carriage; said dog pivoted upon the framework and one end thereof being engaged by said main lever to swing the other end thereof into the path of the wheel teeth.

WILLIAM F. HELMOND.

Witnesses:
W. M. BYORKMAN,
LYMAN D. BROUGHTON.